US010387091B2

(12) United States Patent
Sugiyama

(10) Patent No.: US 10,387,091 B2
(45) Date of Patent: Aug. 20, 2019

(54) IMAGE PROCESSING DEVICE, CONTROL METHOD, AND NON-TRANSITORY RECORDING MEDIUM FOR PROCESSING ONE OR MORE TYPES OF PRINT JOBS INCLUDING AT LEAST ONE TYPE OF DECOLORABLE TONER

(71) Applicants: KABUSHIKI KAISHA TOSHIBA, Tokyo (JP); TOSHIBA TEC KABUSHIKI KAISHA, Tokyo (JP)

(72) Inventor: Hiroyuki Sugiyama, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 15/712,687

(22) Filed: Sep. 22, 2017

(65) Prior Publication Data

US 2019/0095158 A1    Mar. 28, 2019

(51) Int. Cl.
*G06F 3/12* (2006.01)
*B41J 2/045* (2006.01)

(52) U.S. Cl.
CPC .......... *G06F 3/1262* (2013.01); *G06F 3/1241* (2013.01); *B41J 2/04531* (2013.01); *G06F 3/1205* (2013.01); *G06F 3/1212* (2013.01)

(58) Field of Classification Search
USPC ........... 358/1.1–3.29, 1.11–1.18; 399/27–33, 399/43–51, 87, 122
See application file for complete search history.

(56) References Cited

U.S. PATENT DOCUMENTS

| 7,010,240 | B2 * | 3/2006 | Fuma | G03G 15/2064 |
| | | | | 399/328 |
| 9,042,760 | B2 * | 5/2015 | Mita | G03G 15/2039 |
| | | | | 399/44 |
| 9,335,694 | B2 | 5/2016 | Fukaya | |
| 9,405,241 | B2 * | 8/2016 | Imamiya | H04N 1/32101 |
| 10,042,302 | B2 * | 8/2018 | Matsumoto | G03G 15/5062 |
| 2008/0013970 | A1 * | 1/2008 | Kikuchi | G03G 15/5062 |
| | | | | 399/45 |

(Continued)

FOREIGN PATENT DOCUMENTS

JP    2006-123421 A    5/2006
JP    2008-273141 A    11/2008

(Continued)

OTHER PUBLICATIONS

Search Report dated Jan. 22, 2019, received in corresponding European application No. 18 19 5840.6, 7 pages.

*Primary Examiner* — Marcellus J Augustin
(74) *Attorney, Agent, or Firm* — Foley & Lardner LLP

(57) ABSTRACT

An image processing device includes a heating unit, a memory, and a control unit. The heating unit heats a sheet at a temperature which is determined in each type of job in processing of a job related to image processing. The memory stores a type of job, and the number of sheets which is processed in the job, in each of job which is not executed yet. The control unit rearranges an executing order of jobs which are not executed yet so that jobs of the same type are continuously performed, when there is a job of which the number of sheets to be processed in one job is larger than the predetermined number of sheets.

12 Claims, 9 Drawing Sheets

(56) References Cited

U.S. PATENT DOCUMENTS

2010/0149576 A1* 6/2010 Morihara ........... G06K 15/1822
                                                    358/1.13
2015/0253709 A1* 9/2015 Fukaya ................. G03G 21/20
                                                    399/82

FOREIGN PATENT DOCUMENTS

JP      2014-077861 A    5/2014
JP      2014-209258 A   11/2014

* cited by examiner

| TYPE OF JOB (PHYSICAL PROPERTY OF TONER) | CONTROL TEMPERATURE |
|---|---|
| DECOLORABLE IMAGE FORMING JOB (FIXING TEMPERATURE OF DECOLORABLE TONER) | 100°C |
| NON-DECOLORABLE IMAGE FORMING JOB (FIXING TEMPERATURE OF NON-DECOLORABLE TONER) | 130°C |
| DECOLORING JOB (DECOLORING TEMPERATURE OF DECOLORABLE TONER) | 150°C |

IMAGE PROCESSING DEVICE, CONTROL METHOD, AND NON-TRANSITORY RECORDING MEDIUM FOR PROCESSING ONE OR MORE TYPES OF PRINT JOBS INCLUDING AT LEAST ONE TYPE OF DECOLORABLE TONER

FIELD

Embodiments described herein relate generally to an image processing device, a control method, and a non-transitory recording medium.

BACKGROUND

There is an image forming apparatus which can form an image using decolorable toner of which a color can be decolorized using heating, and non-decolorable toner. In addition, there is an image forming apparatus which is further provided with a function of decolorizing decolorable toner which is formed on a sheet.

A temperature of a fixer in a job of forming an image using decolorable toner, a temperature of a fixer in a job of forming an image using non-decolorable toner, and a temperature of a fixer in a job of decolorizing decolorable toner are different from each other.

For this reason, when an image forming apparatus executes a plurality of jobs which are received in a predetermined period in received order, there is a case in which a temperature rise and cooling of the fixer are frequently performed. It takes time in a temperature rise or cooling of the fixer, and it consumes power. For this reason, there is a possibility that time or power is wasted depending on an executing order of jobs.

DETAILED DESCRIPTION

An image processing device according to an embodiment includes a heating unit, a memory, and a control unit. The heating unit heats a sheet at a temperature which is determined in each type of job in processing of a job related to image processing. The memory stores a type of job, and the number of sheets which is processed in the job, in each job which is not executed yet. The control unit rearranges an executing order of jobs which are not executed yet so that jobs of the same type are continuously performed, when there is a job of which the number of sheets to be processed in one job is larger than the predetermined number of sheets.

Figure 1:
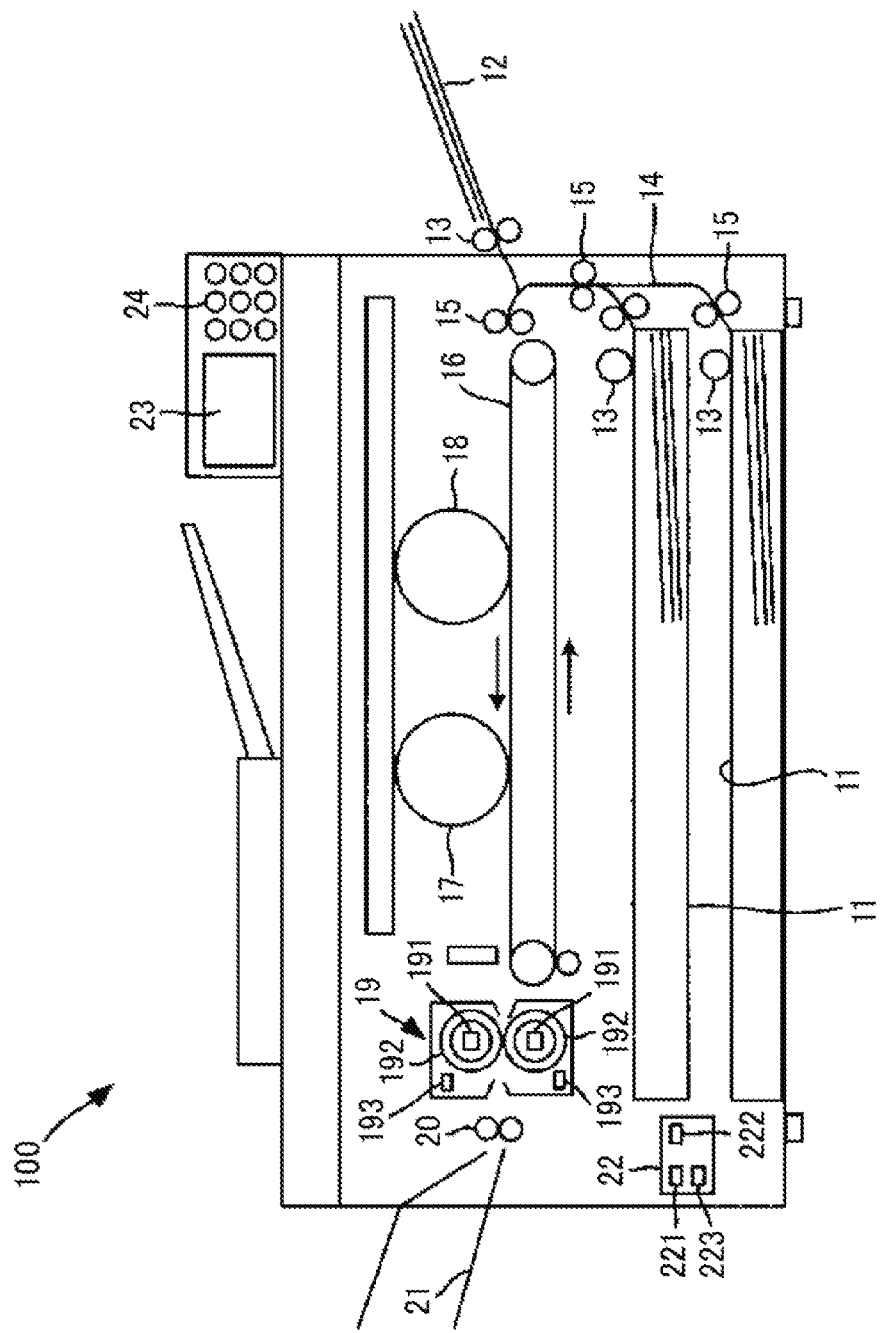
FIG. 1 is a diagram which schematically illustrates a configuration of an image processing device.

FIG. 1 is a diagram which schematically illustrates a configuration of an image processing device 100.

The image processing device 100 can execute at least three types of jobs as jobs related to image processing. The three types of jobs include a non-decolorable image forming job, a decolorable image forming job, and a decoloring job. The non-decolorable image forming job is a job in which an image is formed on a sheet using non-decolorable toner. The decolorable image forming job is a job in which an image is formed on a sheet using a decolorable toner. The decoloring job is a job in which an image formed on a sheet using the decolorable toner is decolorized. These jobs are executed by an operation of a user in the image processing device 100. In addition, these jobs can be executed by an instruction from a personal computer (PC) which is connected, using a network.

The decolorable toner includes a coloring compound, a developer, and a decoloring agent. As the coloring compound, there is a leuco dye which is developed in blue, for example. As the developer, there is phenol, for example. As the decoloring agent, there is a material which is compatible with the coloring compound when being heated, and has no affinity with the developer. A decolorable color material is developed due to a transaction between the coloring compound and the developer, and is decolorized when the transaction between the coloring compound and the developer is discontinued due to heating of a decoloring temperature or more.

The image processing device 100 is provided with a paper feeding cassette 11, a paper feeding tray 12, a paper feeding unit 13, a transport path 14, a transport roller 15, and a transport belt 16. The image processing device 100 is provided with a first image forming unit 17, a second image forming unit 18, a heat source 19, a paper discharge unit 20, a paper discharge tray 21, a controller 22, a display 23, and an operation unit 24.

A sheet as an image forming processing target is stored on the paper feeding cassette 11.

A sheet as a reuse processing target on which an image using decolorable toner is formed is stored on the paper feeding tray 12. The paper feeding unit 13 takes out a sheet from the paper feeding cassette 11, and feeds the sheet to the transport path 14 when the image processing device 100 executes a decolorable image forming job using decolorable toner, and a non-decolorable image forming job using non-decolorable toner. The paper feeding unit 13 takes out a sheet from the paper feeding tray 12, and feeds the sheet to the transport path 14 when the image processing device 100 executes a decoloring job.

The transport path 14 is a path of a sheet from the paper feeding cassette 11 and the paper feeding tray 12 to the paper discharge tray 21, and guides a sheet toward the downstream side.

The transport roller 15 is located at an appropriate position of the transport path 14, and conveys a sheet toward the downstream side.

The transport belt 16 is located at a position on the transport path 14, and conveys a sheet to the heat source 19.

The first image forming unit 17 is located on the downstream side of the second image forming unit 18, and forms an image using decolorable toner on a sheet transported by the transport belt 16. The first image forming unit 17 is set so as to form an image using only decolorable toner of a blue color; however, the unit may form an image using decolorable toner of a plurality of colors.

The second image forming unit 18 forms an image using non-decolorable toner on a sheet transported by the transport belt 16. The second image forming unit 18 is set so as to form an image using only non-decolorable toner of a black color; however, the second image forming unit may form an image using non-decolorable toner of a plurality of colors.

The first image forming unit 17 and the second image forming unit 18 develop an electrostatic latent image formed on a photoreceptor using a laser optical system, for example, using a developing device, and transfers a toner image on the photoreceptor to a sheet.

The heat source 19 includes a heater 191, a heating roller 192, and a temperature sensor 193.

The heater 191 is located in the inside, or at the periphery of the heating roller 192, and heats the heating roller 192. The controller 22 sets a temperature of the heating roller 192 to fall in a range of a target control temperature (control temperature) by increasing, decreasing, or maintaining a temperature of the heating roller 192, by adjusting an output of the heater 191.

A pair of heating rollers 192 is provided, and the heating roller comes into contact with each face of a sheet. The heating roller 192 heats a sheet on which an image is formed by the first image forming unit 17 and the second image forming unit 18, and causes the image to be fixed onto the sheet. In addition, the heating roller 192 heats a sheet on which an image using decolorable toner is present, and decolorizes the image.

The temperature sensor 193 is provided at the periphery of the heating roller 192, and detects a temperature of the heating roller 192.

The paper discharge unit 20 discharges the sheet which passes through the heat source 19 to the paper discharge tray 21.

The controller 22 includes a processor 221, a memory 222, and a hard disk drive (HDD) 223, and controls the entire image processing device 100. The processor 221 executes various functions of the image processing device 100 by executing a program which is stored in the memory 222 or the HDD 223.

The display 23 is a touch panel, or the like, displays a screen, and also has a function of an operation unit which receives an input of a user.

The operation unit 24 includes a button, or a key, and receives an input of a user.

Figures 2, 3:
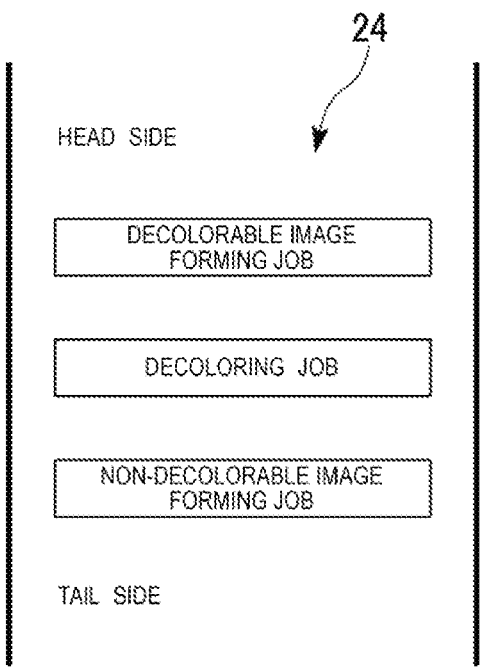
FIG. 2 is a diagram which illustrates a job queue in an HDD.
FIG. 3 is a diagram which illustrates a control temperature of a heat source when executing each job.

FIG. 2 is a diagram which illustrates a job queue 24 in the HDD 223.

When receiving an executing instruction of a decolorable image forming job, a decoloring job, and a non-decolorable image forming job, the controller 22 registers the jobs in the job queue 24 which is a storage area in the HDD 223.

The job queue 24 registers jobs in order of receiving. The controller 22 executes jobs in order from the head side which is subjected to the earliest processing in the job queue 24, and deletes the executed job from the job queue 24.

FIG. 3 is a diagram which illustrates a control temperature of the heat source 19 when executing each job.

A fixing temperature of the decolorable toner is 100° C., a fixing temperature of the non-decolorable toner is 130° C., and a decoloring temperature of the decolorable toner is 150° C. Therefore, the controller 22 sets a control temperature of the heat source 19 to approximately 100° C., in a case of a decolorable image forming job using decalarable toner. The controller 22 sets a control temperature of the heat source 19 to approximately 130° C. in a case of a non-decolorable image forming job using non-decolorable toner. The controller 22 sets a control temperature of the heat source 19 to approximately 150° C., in a case of a decoloring job of an image using decolorable toner.

When receiving jobs, in order of the decolorable image forming job, the decoloring job, and the non-decolorable image forming job, for example, it is necessary for the controller 22 to increase a temperature of the heat source 19 by 50° C. when executing the decoloring job after executing the decolorable image forming job. On the other hand, it is necessary for the controller 22 to decrease a temperature of the heat source 19 by 20° C. when executing the non-decolorable image forming job after executing the decoloring job.

For this reason, when an image processing device executes a plurality of jobs which are received in a predetermined period in order of receiving, as in the related art, there is a case in which a temperature rise or cooling of the heat source 19 is frequently performed. Since the temperature rise or cooling of the heat source 19 takes time, and power is wasted, there is a possibility that a time or power is wasted depending on an executing order of jobs.

Meanwhile, when the heat source 19 is continuously controlled at a high temperature for a predetermined period, heat is accumulated in the vicinity of the heat source 19, and a time necessary for cooling is lengthened. In other words, when the heat source 19 is not continuously controlled at a high temperature for a predetermined period, the heat source can be easily cooled, relatively.

Therefore, according to the embodiment, a rearrangement of an executing order of jobs is performed by taking the number of sheets to be processed in one job into consideration.

Specifically, the controller 22 rearranges an executing order of jobs which are not executed yet so that jobs of the same type are continuously performed, when the number of sheets to be processed in one job is larger than the predetermined. number of sheets. In this manner, a waste of time or power is suppressed.

Meanwhile, when there, is no job in which the number of sheets to be processed in one job is larger than the predetermined number of sheets, the controller 22 executes jobs in order of receiving executing instructions of the jobs. In this manner, it is possible to improve usability of a user, since an executing order of jobs is secured.

In the following descriptions, there is a case in which the non-decolorable image forming job is expressed as "normal printing". In addition, there is a case in which the decolorable image forming job is expressed as "decolorable printing". There is a case in which the decoloring job is expressed as "decoloring".

The above described predetermined number of sheets is determined in each type of job. The reason for this is that a temperature of a heat source is different depending on a job. The higher the temperature of the heat source, the longer the time for cooling, therefore, the predetermined number of sheets is set to be small, when it is a type of job in which a temperature of the heat source 19 is high. Accordingly, the predetermined number of sheets becomes small in order of the predetermined number of sheets in decolorable printing, the predetermined number of sheets in normal printing, and the predetermined number of sheets in decoloring.

Figure 4:
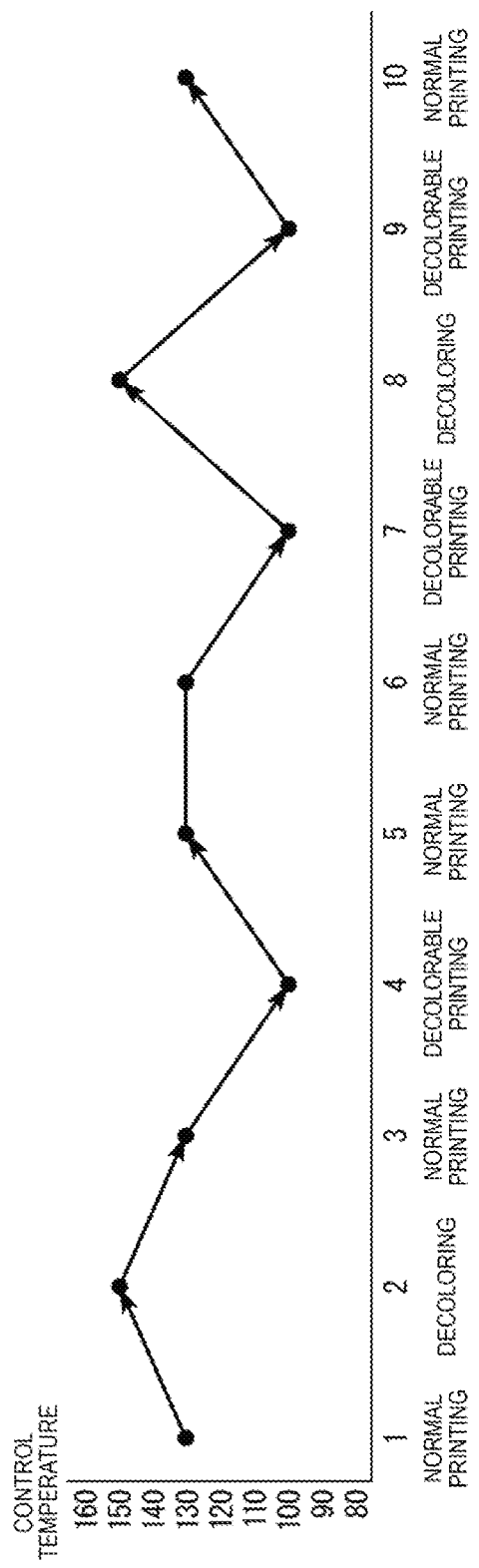
FIG. 4 is a diagram which illustrates a control example when there is no job of which the number of sheets is larger than the predetermined number of sheets.

FIG. 4 is a diagram which illustrates a control example when there is no job in which the number of sheets to be processed in one job is larger than the predetermined number of sheets. In FIG. 4, it is assumed that normal printing, decoloring, normal printing, decolorable printing, normal printing, normal printing, decolorable printing, decoloring, decolorable printing, and normal printing are registered in order from the head side, in the job queue 24. In addition, there is no job in which the number of sheets to be processed in one job s larger than the predetermined number of sheets, in the jobs registered in the job queue 24.

In this case, the controller 22 executes jobs in order of receiving executing instruction of the jobs. Accordingly, as illustrated in FIG. 4, jobs are executed in order of normal printing, decoloring, normal printing, decolorable printing, normal printing, normal printing, decolorable printing, decoloring, decolorable printing, and normal printing. In this manner, it is possible to improve usability of a user, since an executing order of jobs is secured. In addition, since all of jobs have the number of sheets which is the predetermined number of sheets or less, there is little influence on time and power consumption.

Subsequently, a control of the controller 22 in which an executing order of jobs which are not executed yet is rearranged so that jobs of the same type are continuously performed will be described. The controller 22 rearranges an executing order of jobs which are not executed yet, so that a type of a job which is executed at a temperature of which a change from a temperature of the heat source 19, when the jobs which are not executed yet can be executed, is the smallest can be executed first. Accordingly, a control of rearrangement depends on a temperature of the heat source 19 at a starting point of time of the jobs which are not executed yet. However, the rearrangement in which jobs of the same type are set to be continuous is performed without depending on a temperature of the heat source 19.

Figure 5:
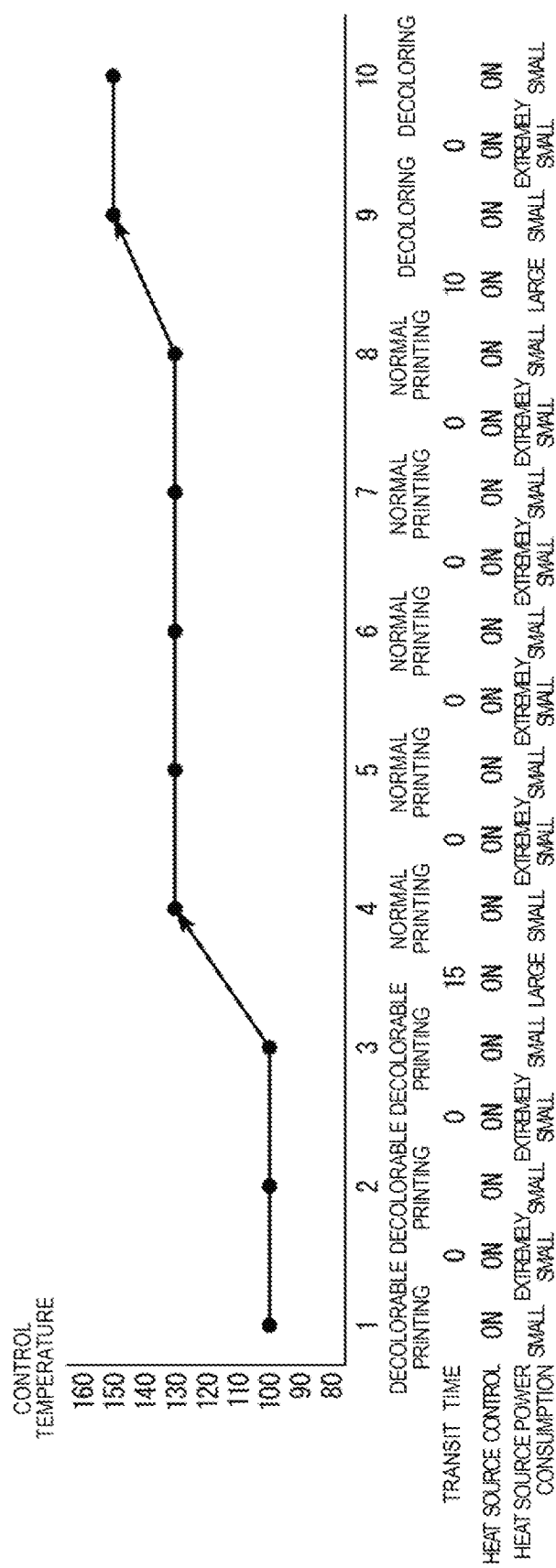
FIG. 5 is a diagram which illustrates a control example when there is a job of which the number of sheets is larger than predetermined number of sheets.
Figure 6:
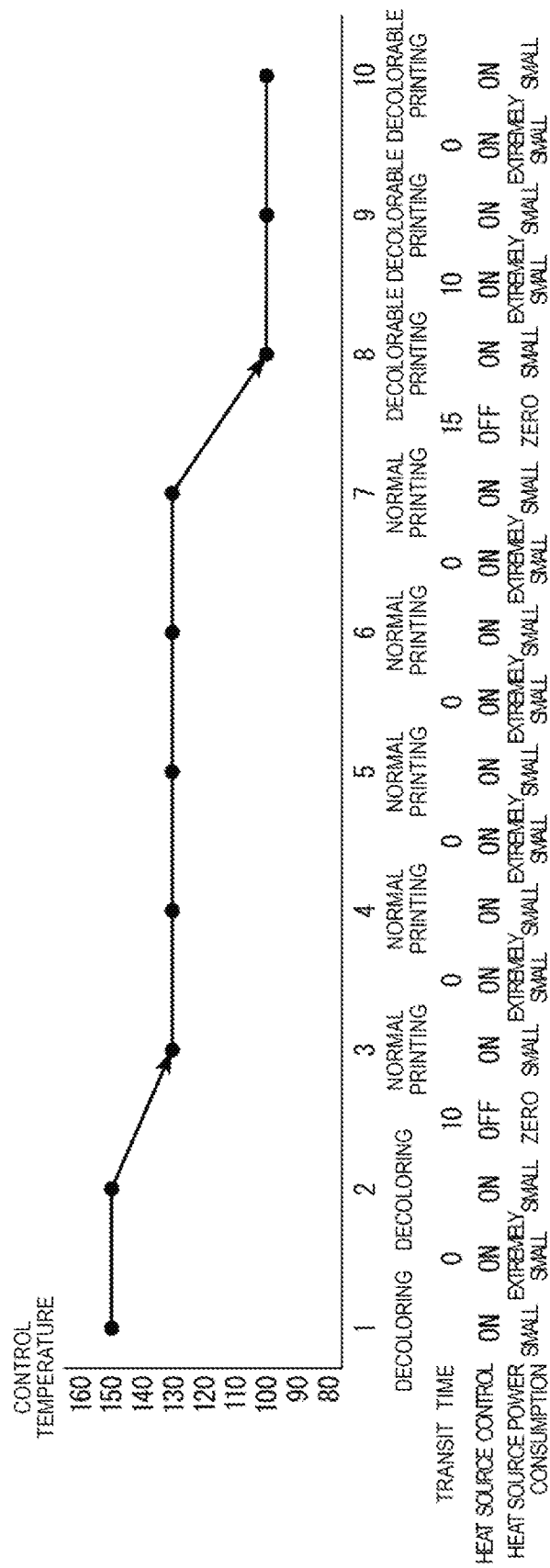
FIG. 6 is a diagram which illustrates a control example when there is a job of which the number of sheets is larger than the predetermined number of sheets.

FIGS. 5 and 6 are diagrams which illustrate a control example when there is a job in which the number of sheets to be processed in one job is larger than the predetermined number of sheets. In FIGS. 5 and 6, it is assumed that normal printing, decoloring, normal printing, decolorable printing, normal printing, normal printing, decolorable printing, decoloring, decolorable printing, and normal printing are registered in order from the head side, in the job queue 24. In addition, there is a job in which the number of sheets to be processed in one job is larger than the predetermined number of sheets is present in the jobs which are registered in the job queue 24.

In addition, a difference between FIG. 5 and FIG. 6 is a temperature of the heat source 19 at a starting point of time of jobs which are not executed yet. FIG. 5 illustrates a control example when a temperature of the heat source 19 at the starting point of time of jobs which are not executed yet is 100° C. FIG. 6 illustrates a control example when a temperature of the heat source 19 at the starting point of time of the jobs which are not executed yet is 150° C.

In addition, a "transit time" in FIGS. 5 and 6, denotes a time from the end of one job to a start of the subsequent job (unit of millisecond). A "control of heat source" denotes whether or not power is supplied to the heat source 19. When the "control of heat source" is "ON", it denotes that power is supplied to the heat source 19. When the "control of heat source" is "OFF", it denotes that power is not supplied to the heat source 19. "Power consumption of heat source" denotes power consumption of the heat source 19. According to the embodiment, "large" in the "power consumption of heat source" denotes 200 W. "Small" in the "power consumption of heat source" denotes 50 W. "Extremely small" in the "power consumption of heat source" denotes 20 W. "Zero" in the "power consumption of hear source" denotes 0 W.

First, FIG. 5 will be described. In FIG. 5, a temperature of the heat source 19 at a starting point of time of jobs which are not executed yet is set to 100® C. As described above, the controller 22 rearranges an executing order of jobs which are not executed yet so that a type of job which is executed at a temperature of which a change from a temperature of the heat source 19 when is being executed is the smallest is executed first. Accordingly, the controller 22 rearranges jobs in order of decolorable printing, normal printing, and decoloring. Accordingly, as illustrated in FIG. 5, the jobs are executed in order of decolorable printing, decolorable printing, decolorable printing, normal printing, normal printing, normal printing, normal printing, normal printing, decoloring, and decoloring.

As illustrated in FIG. 5, all of the "transit times" are set to 0 ms, except for 15 ms when transiting from the third decolorable printing to the fourth normal printing, and 10 ms from the eighth normal printing to the ninth decoloring. In addition, all of the "power consumption of heat source" are set to "small" or "extremely small", except for "large" when transiting from the third decolorable printing to the fourth normal printing, and "large" when transiting from the eighth normal printing to the ninth decoloring. The entire power consumption under a control illustrated in FIG. 5 is 1,040 W.

In this manner, by rearranging jobs of the same type so as to be continuous, it is possible to suppress waste in the "transit time" and the "power consumption of heat source". In addition, since rearranging of jobs is performed according to a temperature of the heat source 19 at a starting point of time of jobs which are not executed yet, there is no waiting time at a starting time of jobs which are not executed yet.

Subsequently, FIG. 6 will be described. In FIG. 6, a temperature of the heat source 19 at a starting point of time of jobs which are not executed yet is set to 150° C. Accordingly, the controller 22 rearranges jobs in order of decoloring, normal printing, and decolorable printing. Accordingly, as illustrated in FIG. 6, jobs are executed in order of decoloring, decoloring, normal printing, normal printing, normal printing, normal printing, normal printing, decolorable printing, decolorable printing, and decolorable printing.

As illustrated in FIG. 6, all of the "transit times" are set to 0 ms, except for 10 ms when transiting from the second decoloring to third normal printing, and 15 ms when transiting from the seventh normal printing to the eighth decolorable printing. In addition, the "power consumption of heat source" is "zero", "small", or "extremely small". The entire power consumption under a control illustrated in FIG. 6 is 640 W.

In this manner, by rearranging jobs of the same type, it is possible to suppress a waste in the "transit time" and the "power consumption of heat source". In addition, since a rearrangement is performed according to a temperature of the heat source 19 at a starting point of time of jobs which are not executed yet, there is no waiting time at a starting time of the jobs which are not executed yet.

In FIGS. 5 and 6, a temperature of the heat source 19 at a starting point of time of jobs which are not executed yet is set to 100° C. or 150° C.; however, when the temperature is 130° C., the rearrangement is performed so that normal printing becomes the head. The controller 22 performs rearranging of jobs in order in which it is possible to suppress a waste in time and power, between order of normal printing, decolorable printing, decoloring and order of normal printing, decoloring, decolorable printing.

Figure 7:
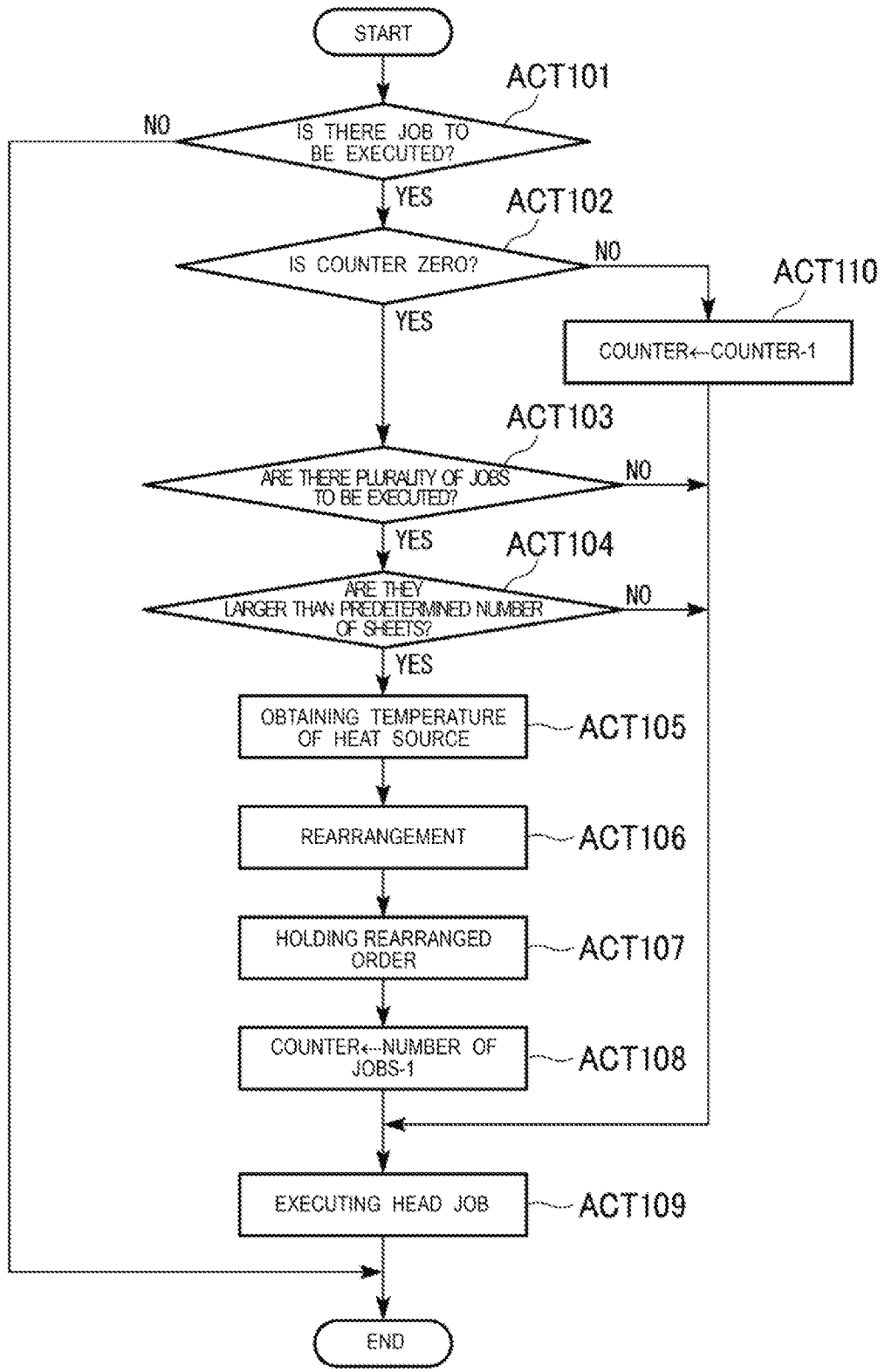
FIG. 7 is a flowchart which illustrates a flow of processing of a controller at a time of ending a job.

FIG. 7 is a flowchart which illustrates a flow of processing of the controller 22 when finishing jobs. A registration of jobs in the job queue 24 is executed by a separate task. For this reason, when there is a possibility that the above described separate task is executed by a dispatcher, or the like, in the middle of executing the processing illustrated in FIG. 7, an exclusive control with respect to the job queue 24 is performed in the middle of executing the processing illustrated FIG. 7. Hereinafter, FIG. 7 will be described based on these.

When jobs are finished, the controller 22 determines whether or not there is a job to be executed with reference to the job queue 24 (ACT 101). When there is no job to be executed (NO in ACT 101), the controller 22 finishes the processing. In this manner, the image processing device 100 enters an idle state.

When there is a job to be executed (YES in ACT 101), the controller 22 determines whether or not a counter is zero (ACT 102). The counter is a counter for managing the number of jobs which are rearranged. When the counter is not zero, it denotes that there are jobs which are not executed yet in the rearranged jobs.

When the counter is not zero (NO in ACT 102), the controller 22 subtracts 1 from the counter (ACT 110). In addition, the controller 22 executes the head job of the job queue 24 (ACT 109) and finishes the processing.

When the counter is zero (NO in ACT 102), the controller 22 determines whether or not there is a plurality of jobs to be executed (ACT 103) with reference to the job queue 24. When there is not a plurality of jobs to be executed (NO in ACT 103) the controller 22 executes the head job of the job queue 24 (ACT 109), and finishes the processing.

When there is a plurality of jobs to be executed (YES in ACT 103), the controller 22 determines whether or not there are jobs of which the number of sheets to be processed in one job is larger than the predetermined number of sheets (ACT 104). In ACT 104, whether or not the number of sheets to be processed in at least one job which is not executed yet, in jobs to be executed, is larger than the predetermined number of sheets.

When there is no job of which the number of sheets to be processed in one job is larger than the predetermined number of sheets (NO in ACT 104), the controller 22 executes the head job of the job queue 24 (ACT 109), and finishes the processing.

When there is a job of which the number of sheets to be processed in one job is larger than the predetermined number of sheets (YES in ACT 104), the controller 22 obtains a temperature of the heat source 19 (ACT 105). The controller 22 performs rearrangement so that a type of job which is closest to the obtained temperature becomes the head, and jobs of the same type to be continuous (ACT 106).

The controller 22 holds the rearranged order in the job queue 24 (ACT 107), and substitutes a number obtained by subtracting 1 from the number of jobs in the counter (ACT 108). Here, the number of jobs is a total number of jobs which are not executed yet as a target of rearrangement. The controller 22 executes the head job of the job queue 24 (ACT 109) and finished the processing. There is a case in which the processing illustrated in FIG. 7 is expressed as processing at a job ending time, in the following descriptions.

Hereinafter, control contents will be described, using some specific patterns. A first pattern is a pattern in which jobs not executed yet are not present at a job ending time. In the first pattern, the controller 22 finishes processing as is, since there is no job which is not executed yet at the job ending time (NO in ACT 101).

A second pattern is a pattern in which there is only one job which is not executed yet at a job ending time in a state in which rearrangement is not performed, and there is no reception of a job, thereafter. In the second pattern, firstly, the controller 22 determines whether or not the counter is zero (ACT 102), since there is a job which is not executed yet at the job ending time (YES in ACT 101).

As described above, since it is a state in which rearranging is not performed, the counter is zero. Subsequently, the controller 22 determines whether or not there is a plurality of jobs to be executed; however, the controller executes the head job of the job queue 24 (ACT 109), since there is one job to be executed (NO in ACT 103), and finishes the processing.

Figure 8:
FIG. 8 is a diagram which illustrates a control example of a third pattern.

A third pattern is a pattern in which rearrangement is not performed, there are three jobs which are not executed yet at a job ending time, and there is no reception of a job thereafter. In addition, all of the three jobs in the third pattern are jobs of which the number of sheets to be processed in one job is the predetermined number of sheets or less. FIG. 8 is a diagram which illustrates a control example of the third pattern. Three jobs of job 1, job 2, and job 3 are registered in the job queue 24 at an ending time of the previous job.

For this reason, the controller 22 determines that there is a job to be executed (YES in ACT 101), determines that the counter is zero (YES in ACT 102), and determines that there are a plurality of jobs to be executed (ACT 103).

The controller 22 determines that there is no job of which the number of sheets to be processed in one job is larger than the predetermined number of sheets (NO in ACT 104), executes the head job of the job queue 24 (ACT 109), and finishes the processing. The same control is performed when finishing job 1 and finishing job 2. When job 3 is finished, the image processing device 100 enters an idle state.

Figure 9:
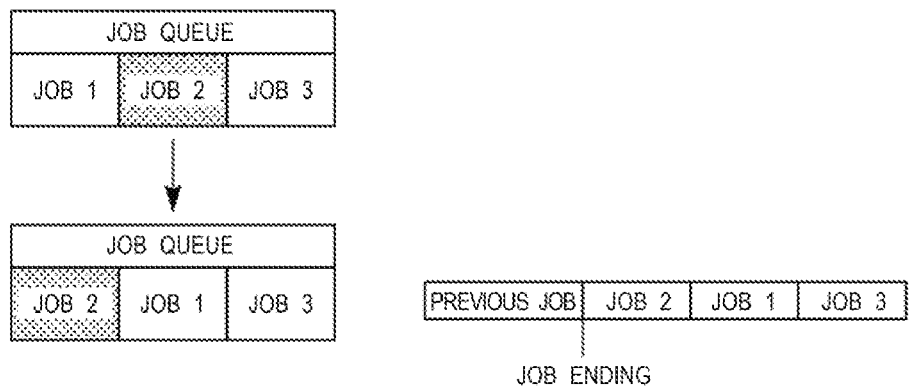
FIG. 9 is a diagram which illustrates a control example of a fourth pattern.

A fourth pattern is a pattern in which three jobs which are not executed yet are present at a job ending time in a state in which rearrangement is not performed, and there is no reception of a job thereafter. In addition, one job among the three jobs in the fourth pattern is a job of which the number of sheets to be processed in one job is larger than the predetermined number of sheets. FIG. 9 is a diagram which illustrates a control example of the fourth pattern. Three jobs of job 1, job 2, and job 3 are registered in the job queue 24 at an ending time of the previous job. Job 2 is a job of which the number of sheets to be processed in one job is larger than the predetermined number of sheets. As in job 2, the job of which the number of sheets to be processed in one job is larger than the predetermined number of sheets is expressed by being meshed in figures.

The controller 22 determines that there is a job to be executed (YES in ACT 101), determines that the counter is zero (YES in ACT 102), and determines that there are a plurality of jobs to be executed (ACT 103).

The controller 22 determines that there is a job of which the number of sheets to be processed in one job is larger than the predetermined number of sheets (YES in ACT 104), and obtains a temperature of the heat source 19 (ACT 105). The controller 22 performs rearrangement so that a type of job which is closest to the obtained temperature becomes the head (ACT 106). It is assumed that an executing order becomes job 2, job 1, and job 3, as a result of rearranging.

The controller 22 holds the rearranged order in the job queue 24 (ACT 107), and substitutes a number obtained by subtracting 1 from the number of jobs in the counter. (ACT 108). In a case of FIG. 9, 2 is substituted in the counter. The controller 22 executes the head job 2 of the job queue 24 (ACT 109), and finishes the processing.

When job 2 is finished, the controller 22 determines that there is a job to be executed (YES in ACT 101), determines that the counter is not zero (NO in ACT 102), and sets the counter to 1 by subtracting 1 from the counter (ACT 110). The controller 22 executes the head job 1 of the job queue 24 (ACT 109), and finishes the processing.

When job 1 is finished, the controller 22 determines that there is a job to be executed (YES in ACT 101), determines that the counter is not zero (NO in ACT 102), and sets the counter to zero by subtracting 1 from the counter (ACT 110). The controller 22 executes the head job 3 of the job queue 24 (ACT 109), and finishes the processing.

When job 3 is finished, the controller 22 determines that there is no job to be executed (NO in ACT 101), and finishes the processing. In this manner, the image processing device 100 enters an idle state.

A fifth pattern is a pattern in which three jobs which are not executed yet are present in a state in which rearrangement is not performed, and there is no reception of a job thereafter. In addition, one job among the three jobs in the fifth pattern is a job of which the number of sheets to be processed in one job is larger than the predetermined number of sheets.

The fifth pattern receives three more jobs in the middle of executing jobs. One job among the three jobs is a job of which the number of sheets to be processed in one job is larger than the predetermined number of sheets.

Figure 10:
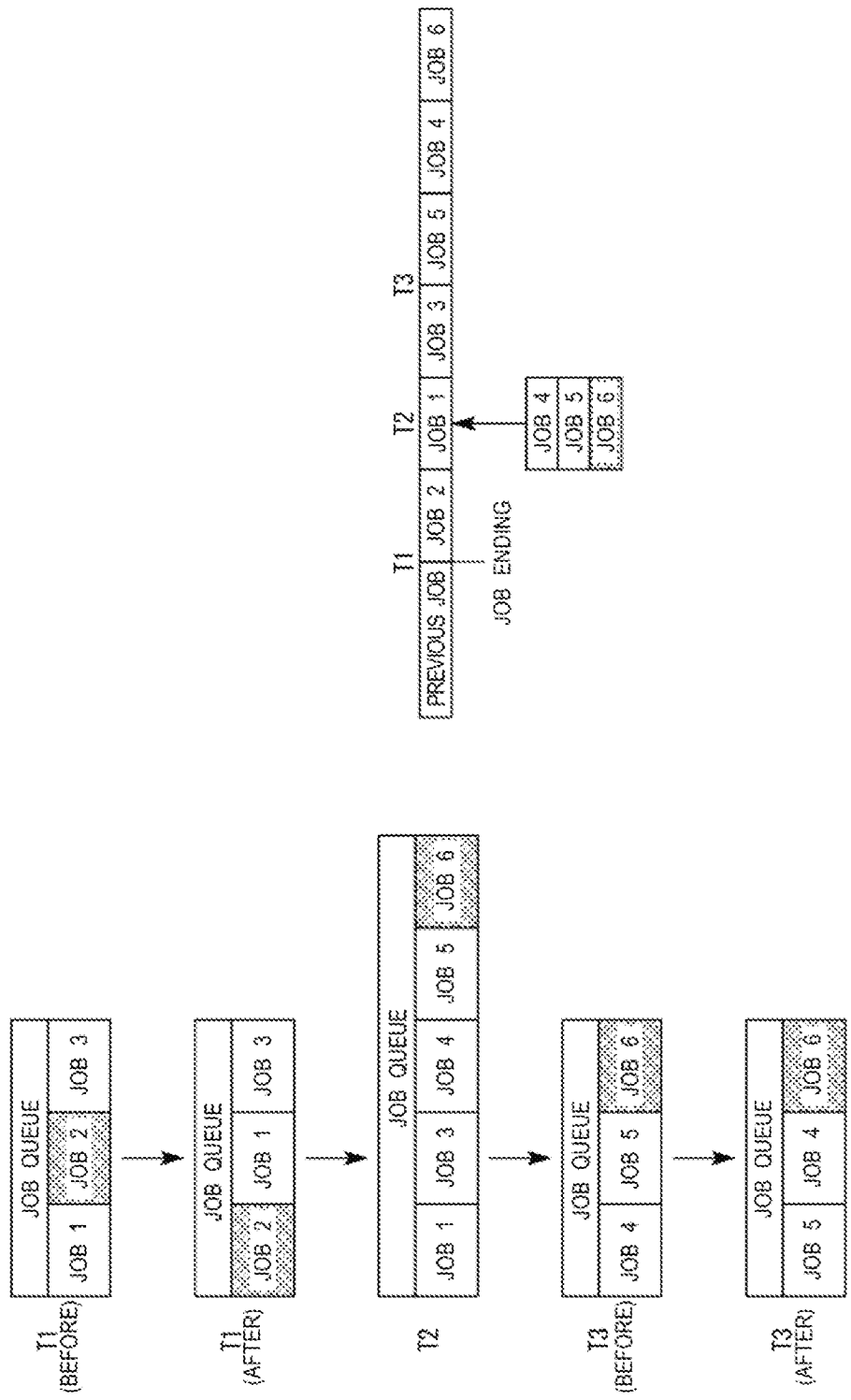
FIG. 10 is a diagram which illustrates a control example of a fifth pattern.

FIG. 10 is a diagram which illustrates a control example of the fifth pattern. Three jobs of job 1, job 2, and job 3 are registered in the job queue 24 at a time of ending the previous job. Job 2 is a job of which the number of sheets to be processed an one job as larger than the predetermined number of sheets. In FIG. 10, for ease of understanding T1, T2, and T3 which denote timings are illustrated. T1, T2, and T3 which are attached to the job queue 24 denote a job queue 24 at the timing.

In addition, TI (before) denotes a timing before executing processing at a time of ending a job in the taming T1. T1 (after) denotes a timing after executing processing at a time of ending a job in the timing T1. T3 (before) denotes a timing before executing processing at a time of ending a job in the timing T3. T3 (after) denotes a timing after executing processing at a time of ending a job -in the timing T3.

The controller 22 starts post processing of job ending in the timing T1 (before). The controller 22 determines that there is a job to be executed (YES in ACT 101), determines that the counter is zero (YES in ACT 102), and determines that there are a plurality of jobs to be executed (ACT 103).

The controller 22 determines that there is a job of which the number of sheets to be processed in one job is larger than the predetermined number of sheets (YES in ACT 104), and obtains a temperature of the heat source 19 (ACT 105). The controller 22 performs rearrangement so that a type of job which is closest to the obtained temperature becomes the head (ACT 106). It is assumed that the executing order is job 2, job 1, and job 3, as a result of the rearrangement.

The controller 22 holds the rearranged order in the job queue 24 (ACT 107), and substitutes a number obtained by subtracting 1 from the number of jobs in the counter (ACT 108). In a case of FIG. 10, 2 is substituted in the counter. The controller 22 executes the head job 2 of the job queue 24 (ACT 109), and finishes the processing.

When job 2 is finished, the controller 22 determines that there is a job to be executed (YES in ACT 101), determines that the counter is not zero (NO in ACT 102), and sets the counter to 1 by subtracting 1 from the counter (ACT 110). The controller 22 executes the head job 1 of the job queue 24 (ACT 109) , and finishes the processing.

The above described job 1 is normal printing. Job 2 is decolorable printing. Job 3 is normal printing. In addition, the previous job is decolorable printing. According, in ACT 106, jobs are rearranged in order of job 2 (decolorable printing), job 1 (normal printing), and job 3 (normal printing). In this manner, the controller 22 performs rearrangement so that a type of job which is closest to the obtained temperature becomes the head. In addition, the controller 22 performs rearrangement so that jobs of the same type are continuously performed. According to the rearrangement, a temperature of the heat source 19 at an ending time of job 3 becomes approximately 130° C.

In the timing T2 in the middle of executing job 1, job 4, job 5, and job 6 are received. Job 6 is a job of which the number of sheets to be processed in one job is larger than the predetermined number of sheets. In this manner, job 4, job 5, and job 6 are registered in the job queue 24. Job 4 is decoloring job. Job 5 is normal printing job. Job 6 is decoloring job.

When job 1 is finished, the controller 22 determines that there is a job to be executed. (YES in ACT 101), determines that the counter is not zero (NO in ACT 102), and sets the counter to zero by subtracting 1 from the counter (ACT 110). The controller 22 executes the head job 3 of the job queue 24 (ACT 109), and finishes the processing.

Job 4, job 5, and job 6 are registered in the job queue 24 at an ending point of time of job 3.

The controller 22 starts post processing of job ending in the timing T3 (before). The controller 22 determines whether or not there is a job to be executed (YES in ACT 101), determines that the counter zero (YES in ACT 102), and determines that there are a plurality of jobs to be executed (ACT 103).

The controller 22 determines that there is a job of which the number of sheets to be processed in one job is larger than the predetermined number of sheets (YES in ACT 104), and obtains a temperature of the heat source 19 (ACT 105). As described above, the temperature of the heat source 19 at an ending time of job 3 becomes 130° C. The controller 22 performs rearrangement so that a type of job which is closest to the obtained temperature becomes the head (ACT 106). The executing order becomes job 5 (normal printing), job 4 (decoloring) and job 6 (decoloring), as a result of the rearrangement. In this manner, the controller 22 performs rearrangement so that a type of job which is closest to the obtained temperature becomes the head. In addition, the controller 22 performs rearrangement so that jobs of the same type are continuously performed.

The controller 22 holds the rearranged order in the job queue 24 (ACT 107), and substitutes a number obtained by subtracting "1" from the number of jobs in the counter (ACT 108). In a case of FIG. 10, 2 is substituted in the counter. The controller 22 executes the head job 5 of the job queue 24 (ACT 109), and finishes the processing.

When job 5 is finished, the controller 22 determines that there is a job to be executed (YES in ACT 101), determines that the counter is not zero (NO in ACT 102), and sets the counter to 1 by subtracting 1 from the counter (ACT 110). The controller 22 executes the head job 4 of the job queue 24 (ACT 109), and finishes the processing.

When job 4 is finished, the controller 22 determines that there is a job to be executed (YES in ACT 101), determines that the counter is not zero (NO in ACT 102), and sets the counter to zero by subtracting 1 from the counter (ACT 110).

The controller 22 executes the head job 6 of the job queue 24 (ACT 109), and finished the processing.

When job 3 is finished, the controller 22 determines that there is no job to be executed (NO in ACT 101), and finishes the processing. In this manner, the image processing device 100 enter an idle state.

As described above, when a new job is registered in the middle of performing rearrangement, rearrangement is performed as necessary, after all of jobs in which rearrangement is performed are finished. That is, jobs which are not executed yet, and are to be rearranged by the controller 22 are jobs which are received in the middle of executing one or more jobs. For example, in a case of FIG. 10, job 4, job 5, and job 6 are received while job 1, job 2, and job 3 are executed. Accordingly, job 4, job 5, and job 6 are rearranged.

In addition, as illustrated in post processing of job ending, there is no limit in the number of jobs which can be received while one or more jobs are executed, and when the number of jobs is two or more, it is possible to perform rearrangement.

In the above described embodiment, in ACT 104, whether or not the number of sheets which are to be processed in at least one job which is not executed yet, among sheets to be executed, is larger than the predetermined number of sheets is determined. The determination in ACT 104 is set to a determination A. In contrast to this, in all of jobs which are not executed yet, when the number of sheets to be processed in each job is larger than the predetermined number of sheets, an executing order of jobs which are not executed yet may be rearranged. A determination which is made by all of the jobs which are not executed yet is set to a determination B.

The determination A is a determination which is preferable for use in an environment in which the number of sheets to be processed in many jobs is larger than the predetermined number of sheets. The determination B is a determination which is preferable for use in an environment in which the number of sheets to be processed in many jobs is the predetermined number of sheets or less.

For example, a case in which the predetermined number of sheets is "10", and five jobs are processed will be described as an example. First, a processing example in which the number of sheets to be processed in many jobs is larger than the predetermined number of sheets is set to a processing example X. Specifically, the processing example X is a processing example of a job in which the each number of sheets of five jobs of job 1 to job 5 is 12, 15, 8, 19, and 17.

In contrast to this, a processing example in which the number of sheets to be processed in many jobs is the predetermined number of sheets or less is set to a processing example Y. Specifically, the processing example Y is a processing example of a job in which the each number of sheets of five jobs of job 1 to job 5 is 2, 5, 8, 20, and 7.

In the case of the determination A, rearrangement is performed in the processing example X and the processing example Y. On the other hand, in the case of determination B, rearrangement is not performed in the processing example X and the processing example Y.

In the jobs in the processing example X, since most of the jobs are jobs in which the number of sheets larger than the predetermined number of sheets is processed, there is a high possibility that time or power is wasted, compared to the case in which rearrangement is not performed. Accordingly, the determination A is preferable for use in an environment in which the number of sheets to be processed in many jobs is larger than the predetermined number of sheets.

On the other hand, in the jobs in the processing example Y, since most of jobs are jobs in which the number of sheets which is the predetermined number of sheets or less is processed, as described in FIG. 4, there is a minor influence of time and power consumption even when rearrangement is performed. In addition, since an executing order of jobs is secured by not performing rearrangement, usability of a user is improved. Accordingly, the determination B is a determination preferable for use in an environment in which the number of sheets processed in many jobs is the predetermined number of sheets or less.

According to the embodiment, when there is a job of which the number of sheets to be processed in one job is larger than the predetermined number of sheets, an executing order of jobs which are not executed yet is rearranged so that jobs of the same type are continuously performed. In this manner, it is possible to suppress a waste in time or power, compared to a case in which jobs of a different type are continuously executed.

On the other hand, when there s no job of which the number of sheets to be processed in one job is larger than the predetermined number of sheets, the controller 22 executes jobs in order of receiving executing instruction of jobs. Since an executing order of jobs is secured in this manner, it is possible to improve usability of a user.

As described above, according to the embodiment, it is possible to suppress a waste in time or power, and improve usability of a user at the same time.

A modification example will be described. In the above described embodiment, whether or not to perform rearrangement is determined by the number of sheets to be processed in jobs; however, whether or not to perform rearrangement is determined by a size of a sheet to be processed in jobs, in the modification example.

Figure 11:
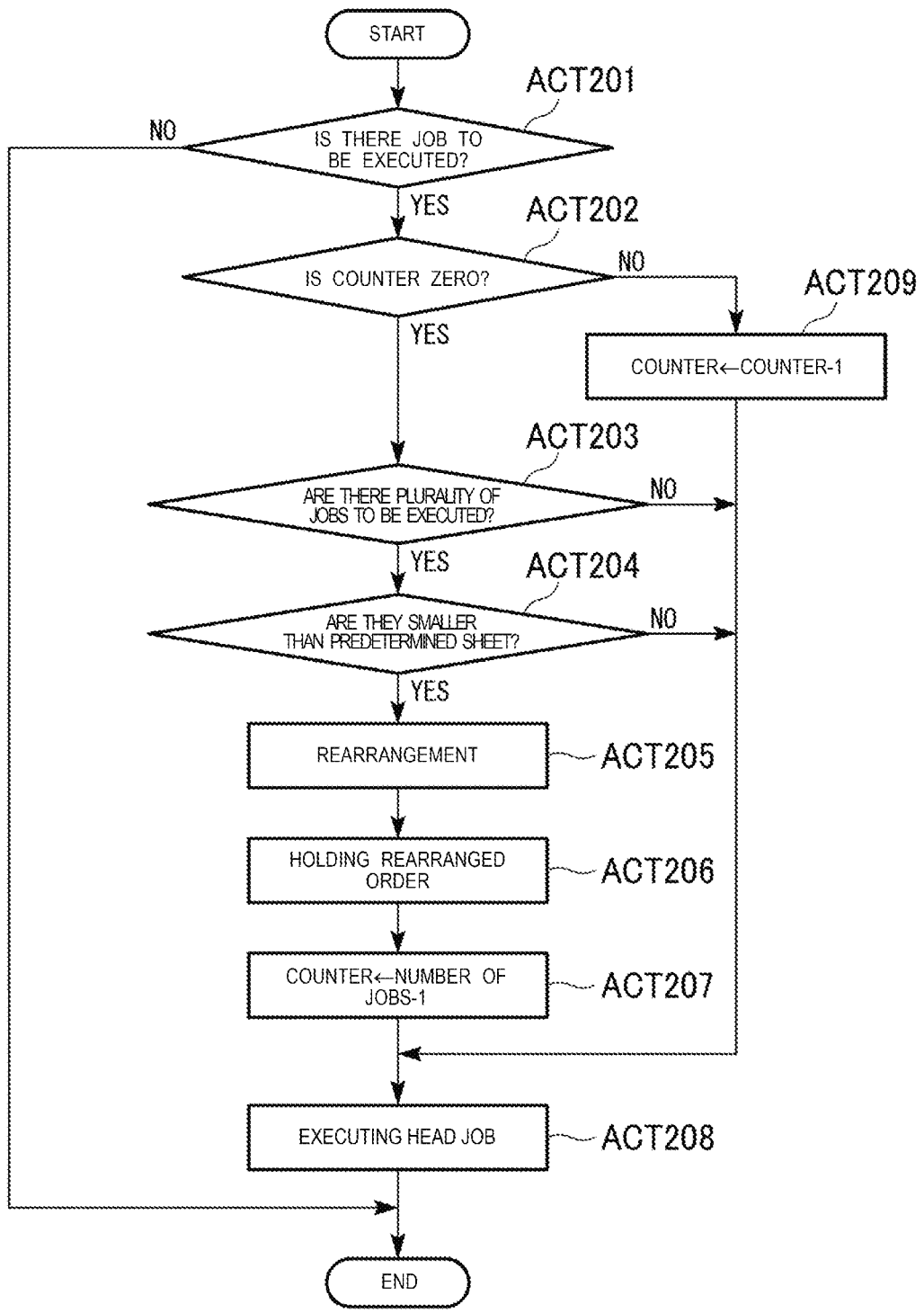
FIG. 11 is a flowchart which illustrates a flow of processing of a controller at a time of ending a job in a modification example.

FIG. 11 is a flowchart which illustrates a flow of processing of the controller 22 at a job ending time in the modification example. A predetermined sheet illustrated in the following flowchart is a sheet of which the number which is processed in the image processing device 100 is the largest. For example, when the sheet of which the number processed in the image processing device 100 is the largest is A4, A4 becomes the predetermined sheet. A sheet which is smaller than the predetermined sheet is a sheet with a size of A5 or B5 or less.

In FIG. 11, when a job is finished, the controller 22 determines whether or not there is a job to be executed, with reference to the job queue 24 (ACT 201). When there is no job to be executed. (NO in ACT 201), the controller 22 finishes the processing. In this manner, the image processing device 100 enters an idle state.

When there is a job to be executed (YES in ACT 201), the controller 22 determines whether or not the counter is zero (ACT 202). The counter is a counter for managing the number of jobs which are rearranged. When the counter is not zero, it denotes that there is a job which is not executed yet in the rearranged jobs.

When the counter is not zero (NO in ACT 202), the controller 22 subtracts 1 from the counter (ACT 209). In addition, the controller 22 executes the head job of the job queue 24 (ACT 208), and finishes the processing.

When the counter is zero (YES in ACT 202), the controller 22 determines whether or riot there are a plurality of jobs to be executed with reference to the job queue 24 (ACT 203). When there is no plurality of jobs to be executed (NO in ACT 203), the controller 22 executes the head job of the job queue 24 (ACT 208), and finishes the processing.

When there are a plurality of jobs to be executed (YES in ACT 203), the controller 22 determines whether or not there is a job of which a size to be processed in one job is smaller than the predetermined sheet (ACT 204). In ACT 204, whether or riot a size of a sheet to be processed in at least one job which is not executed yet, among jobs which are to be executed, is smaller than the predetermined size is determined.

When there is no job of which a size of a sheet to be processed in one job is smaller than a size of the predetermined sheet (NO in ACT 204), the controller 22 executes the head job of the job queue 24 (ACT 208), and finishes the processing.

When there is a job of which a size of a sheet to be processed in one job is smaller than a size of the predetermined sheet (YES in ACT 204), the controller 22 performs rearrangement in descending order of a sheet size (ACT 205) That is, a job of which a sheet size is the largest becomes the head, and a job of which a sheet size is the smallest becomes the tail.

The controller 22 holds the rearranged order in the job queue 24 (ACT 206), and substitutes a number obtained by subtracting 1 from the number of jobs in the counter (ACT 207). The number of jobs here is a total number of jobs which are not executed yet as targets of rearrangement. The controller 22 executes the head job of the job queue 24 (ACT 208), and finishes the processing.

In the above described processing, the reason for performing rearrangement in descending order of a sheet size is as follows. That is, a small-sized sheet, is not able to take heat from the heat source 19 compared to a large-sized sheet, heat is accumulated at an end portion, or in the vicinity of the heat source 19, and it takes a long time for cooling compared to a large-sized sheet.

According to the modification example, when there is a job in which a sheet size to be processed in one job is smaller than the predetermined size, an executing order of jobs which are not executed yet is rearranged so that a sheet size becomes a descending order. In this manner, it is possible to suppress a waste Ln time or power, compared to a case in which jobs in which sheet sizes are different are continuously executed.

On the other hand, when there is no job in which a sheet size to be processed in one job is smaller than the predetermined size, the controller 22 execute jobs in order of receiving executing instructions of the jobs. In this manner, it is possible to improve usability of a user, since an executing order of jobs is secured.

As described above, according to the modification example, it is possible to suppress a waste in time or power, and improve usability of a user at the same time.

Power consumption or a temperature in the above described embodiment is merely an example, and it is not limited to this.

A part of functions of the image processing device 100 in the above described embodiment may be executed in a computer. In such a case, a program for executing the function is recorded in a computer-readable recording medium. In addition, the program recorded in the recording medium in which the above described program is recorded may be executed, by causing a computer system to read the program, and to execute the program. The "computer system" here includes hardware such as an operating system, or a peripheral device. In addition, the "computer-readable recording medium" means a portable medium, a storage device, or the like. The portable medium is a flexible disk, a magneto-optical disk, a ROM, a CD-ROM, or the like. The storage device is a hard disk, or the like, which. is built in the computer system. The "computer-readable recording medium" is a medium which dynamically holds a program for a short time, like a communication line when transmitting a program through a communication channel. The communication channel is a network such as the Internet, a telephone line, or the like. In addition, the "computer-readable recording medium" may be a volatile memory in a computer system, as a server or a client. The volatile memory is a memory which holds a program for a fixed time. The above described program may be a program for executing a part of the above described functions. In addition, the above described program may be a program which executes the above described function by being combined with the program which is recorded in the computer system in advance.

While certain embodiments have been described these embodiments have been presented by way of example only, and are not intended to limit, the scope of the inventions. Indeed, the novel embodiments described herein may be embodied in a variety of other forms. Furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. An image processing device comprising:
   a heater configured to heat a sheet at a temperature determined in each type of job, in processing of a job related to image processing;
   wherein the types of jobs comprise three types of jobs including a job of forming an image on a sheet using decolorable toner, a job of forming an image on a sheet using non-decolorable toner, or a job of decolorizing decolorable toner formed on a sheet, the three types of jobs having different temperature processing requirements,
   a memory which stores a type of job, and the number of sheets processed in the job, for each job of jobs which are not executed yet; and
   a controller configured to determine whether or not there is a job of which the number of sheets to be processed in one job is larger than a predetermined number of sheets, based on the number of sheets stored in the memory, and to rearrange an executing order of jobs which are not executed yet so that jobs of the three types are continuously performed for each type, when there is a job of which the number of sheets to be processed in one job is larger than the predetermined number of sheets,
   wherein the controller is configured to rearrange an executing order of jobs which are, not executed yet, so that a type of job which is executed at the processing temperature of which a change from a temperature of the heater, when the jobs which are not executed yet can be excepted, is the smallest is firstly executed.

2. The device according to claim 1,
   wherein the predetermined number of sheets is determined for each type of job.

3. The device according to claim 2,
   wherein the predetermined number of sheets is set to be smaller for a type of job as the processing temperature required for the type of job increases.

4. The device according to claim 1,
wherein the controller is configured to rearrange an executing order of jobs which are not executed yet, when the number of sheets to be processed in each job is larger than the predetermined number of sheets, in the entire jobs which are not executed yet.

5. The device according to claim 1,
wherein the controller is configured to execute jobs in order of receiving executing instructions of the jobs, when there is no job of which the number of sheets to be processed in one job is larger than the predetermined number of sheets.

6. The device according to claim 1,
wherein jobs which are not executed yet, and are rearranged by the controller, are jobs which are received in the middle of executing one or more jobs.

7. A control method of an image processing device which includes a heater which heats a sheet at a temperature determined for each type of job, in processing of a job related to image processing, and a memory which stores a type of a job, and the number of sheets processed in the job, in each job which is not executed yet, the method comprising:
determining whether or not there is a job of which the number of sheets to be processed in one job is larger than the predetermined number of sheets, based on the number of sheets stored in the memory, wherein the type of jobs comprise three types of jobs including a job of forming an image on a sheet using decolorable toner, a job of forming an image on a sheet using non-decolorable toner, or a job of decolorizing decolorable toner formed on a sheet, the three types of jobs having different temperature processing requirements; and
rearranging an executing order of jobs which are not executed yet so that jobs of the three types are continuously performed for each type, when there is a job of which the number of sheets to be processed in one job is larger than the predetermined number of sheets,
wherein the rearranging comprises rearranging the executing order of jobs which are not executed yet, so that a type of job which is executed at the processing temperature of which a change from a temperature of the heater, when the jobs which are not executed yet can be executed, is the smallest is firstly executed.

8. The method according to claim 7,
wherein the predetermined number of sheets is determined for each type of job.

9. The method according to claim 8,
wherein the predetermined number of sheets is set to be smaller for a type of job as the processing temperature required for the type of job increases.

10. A non-transitory recording medium which records a computer program for causing a computer of an image processing device which includes a heating unit which heats a sheet at a temperature determined in each type of job, to carry out processing of a job related to image processing, and a memory which stores a type job, and the number of sheets processed in the job, in each of job which is not executed yet, the processing comprising:
determining whether or not there is a job of which the number of sheets to be processed in one job is larger than the predetermined number of sheets, based on the number of sheets stored in the memory, wherein the type of jobs comprise three types of jobs including a job of forming an image on a sheet using decolorable toner, a job of forming an image on a sheet using non-decolorable toner, or a job of decolorizing decolorable toner formed on a sheet, the three types of jobs having different temperature processing requirements; and
rearranging an executing order of jobs which are not executed yet so that jobs of the three types, are continuously performed for each type, when there is a job of which the number of sheets to be processed in one job is larger than the predetermined number of sheets,
wherein the rearranging comprises rearranging the executing order of jobs which are not yet, so that a type of job which is executed at the processing temperature of which a change from a temperature of the heating unit, when the jobs which are not executed yet can be executed, is the smallest is firstly executed.

11. The non-transitory recording medium according to claim 10,
wherein the predetermined number of sheets is determined for each type of job.

12. The non-transitory recording medium according to claim 11,
wherein the predetermined number of sheets is set to be smaller for a type of job as the processing temperature required for the type of job increases.

* * * * *